(12) United States Patent
Hwang

(10) Patent No.: US 6,516,398 B2
(45) Date of Patent: Feb. 4, 2003

(54) PROGRAM-DOWNLOADABLE DATA PROCESSING SYSTEM AND METHOD FOR ACCESSING MEMORY BY USING A UNIFIED MEMORY SPACE THEREIN

(75) Inventor: Yung-Chi Hwang, Sanchung (TW)

(73) Assignee: Acer Laboratories Inc., Taipei Hsien (TW)

(*) Notice: Subject to any disclaimer, the term of this patent is extended or adjusted under 35 U.S.C. 154(b) by 175 days.

(21) Appl. No.: 09/779,557

(22) Filed: Feb. 9, 2001

(65) Prior Publication Data

US 2001/0034821 A1 Oct. 25, 2001

(30) Foreign Application Priority Data

Apr. 19, 2000 (TW) .......................................... 89107406 A (51) Int. Cl.$^7$ .............................................. G06F 12/00
(52) U.S. Cl. ........................ 711/202; 711/154; 711/167; 711/217
(58) Field of Search ................................. 711/157, 167, 711/168, 169, 202, 213, 217, 218

(56) References Cited

U.S. PATENT DOCUMENTS 4,527,251 A * 7/1985 Nibby et al. ................. 711/202
5,222,226 A * 6/1993 Yamaguchi et al. ........ 711/202
6,170,041 B1 * 1/2001 LeVasseur et al. .......... 711/100

* cited by examiner

Primary Examiner—Matthew Kim
Assistant Examiner—Christian P. Chace
(74) Attorney, Agent, or Firm—Michael D. Bednarek; Shaw Pittman LLP (57) ABSTRACT

A data processing system and a method for accessing data therein. The data processing system includes a microprocessor, an application specific integrated circuit (ASIC), and a memory. The ASIC is coupled between the microprocessor and the memory and is utilized to communicate with an external computer system for downloading a program code from the external computer system to the memory in which the program code is stored in a memory region of the memory through the ASIC. In addition, the ASIC is for mapping the memory region onto an external memory address space of the microprocessor. The microprocessor generates an address latch enable (ALEN) signal, program memory enable (PMEN) signal, read enable (RDEN) signal, write enable (WREN) signal, and a first address signal. The ASIC, during the enabling period of the ALEN signal, receives the first address signal, converts the first address signal into a second address signal corresponding to an address in the memory region, and reads a first data from the memory according to the second address signal. When the PMEN or RDEN signal is enabled, the ASIC converts the first data into a second data and sends the second data to the microprocessor. When the WREN signal is enabled, the microprocessor sends a third data to the ASIC and the ASIC converts the third data into a fourth data and writes the fourth data into the memory according to the second address signal.

18 Claims, 8 Drawing Sheets

PROGRAM-DOWNLOADABLE DATA PROCESSING SYSTEM AND METHOD FOR ACCESSING MEMORY BY USING A UNIFIED MEMORY SPACE THEREIN

REFERENCE TO RELATED APPLICATION

The present application claims priority of Taiwan application serial No. 89107406, filed on Apr. 19, 2000, and the contents thereof are herein incorporated as reference.

BACKGROUND OF THE INVENTION

1. Field of the Invention

The invention relates in general to a data processing system and method for accessing memory therein, and more particularly to a data processing system capable of executing and downloading programs and the method for accessing data utilizing a unified memory space therein.

2. Description of the Related Art

In the development of a data processing system, the microprocessor is a component contributing to the flexibility of the system. By appropriately changing the program executed by the microprocessor of the system, a product is capable of performing various functions for meeting various specifications required.

The microprocessors, such as the 8051-based microprocessors, are commonly found in the peripheral products of computer systems, such as image scanners, modems, and DVD-ROM drives. 8051-based microprocessors are also called microcontrollers for their self-contained functionality including the processing unit, embedded memory units, and input/output units. Inside these microprocessors, there include read only memory (ROM) and random access memory (RAM) for respectively storing the program and the data processed by the program. In addition, through the built-in input/output (I/O) ports of the microprocessor, it provides functions for system expansion. For instance, through the I/O ports, an external ROM and/or RAM can be connected to the microprocessor for expanding the physical memory space. In another instance, the built-in I/O ports can be connected to an external circuitry, such as an application specific integrated circuit (ASIC), for the purpose of controlling other components.

In the application of the microprocessor to peripherals such as scanners, modems, and DVD drives, the microprocessor acts as an agent for receiving the instructions and data through the interface of a computer system and processing and converting them into the instructions and data for the ASIC of the data processing system. According to the processed instructions and data, the ASIC controls the peripheral's specific components, such as the optical head of a DVD drive. In addition, through the microprocessor, the status and output of the peripheral can be sent to the computer system.

In the application of the microprocessor described above, the program to be executed by the microprocessor is needed to be updated during the development of the system frequently and after leaving factory for the purpose of maintenance for resolving deficiency and adding new functionality. The most direct manner for the replacement of the contents in the ROM storing the program is to program the ROM, such as an electrical programmable ROM (EPROM), by a program writer. In practice, one approach is to design the system with the microprocessor using an external ROM to store the program. Through the replacement of the external ROM with updated version of the program or the programming of the external ROM, the purpose of updating is completed. However, the use of the external ROM increases the production cost. Further, as the kinds of products using external ROM increase, much more costs for management for the ROMs are required.

Another approach is to design the system capable of downloading a program from the external host computer to the system for execution. Utilizing the approach in the design of computer peripherals, they can download the program from a personal computer for updating the binary code of the program to be executed.

Figure 1:
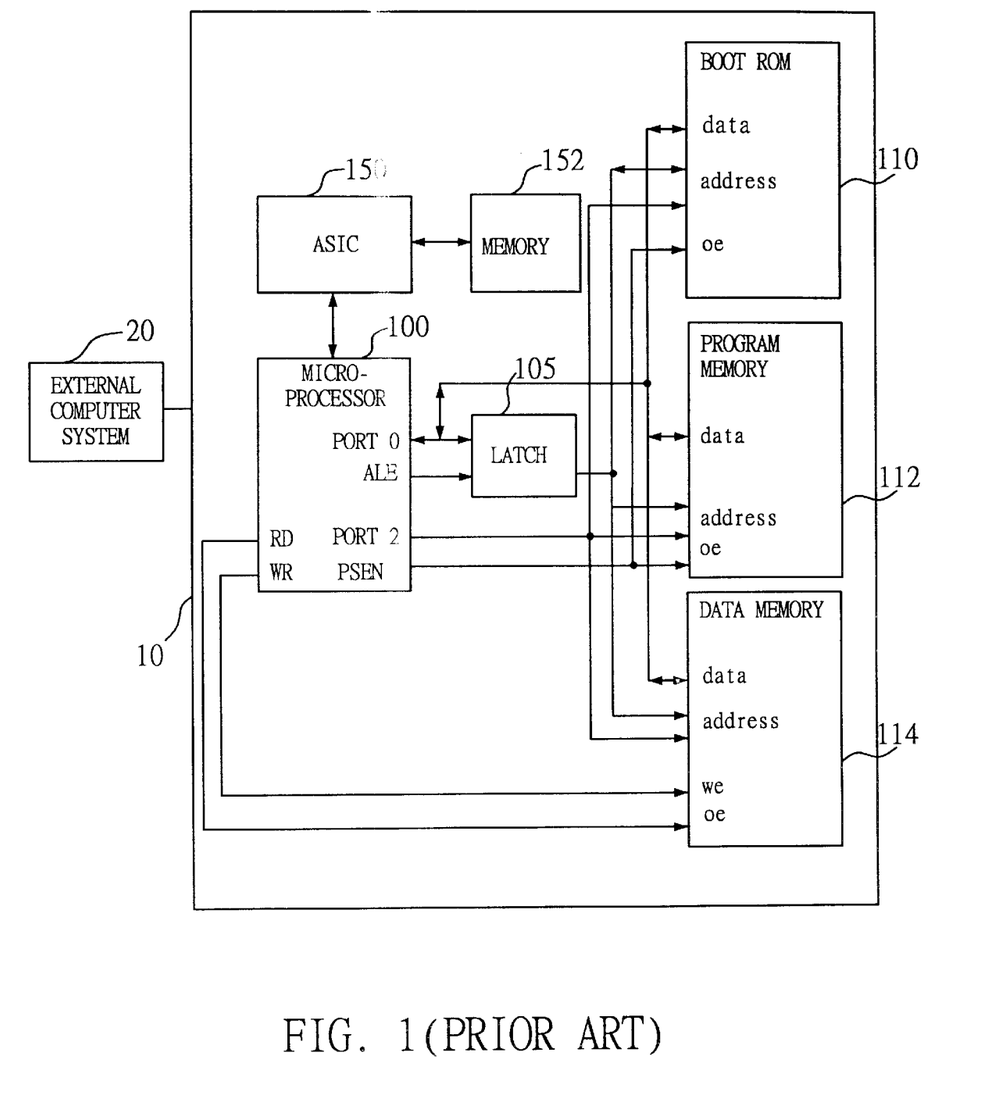
FIG. 1 illustrates a conventional program-downloadable data processing system.

Referring now to FIG. 1, it illustrates a conventional program-downloadable data processing system 10 including a microprocessor 100, a latch 105, a boot ROM 110, a program memory 112, a data memory 114, an ASIC 150, and a memory 152 for the ASIC 150 to access. The system 10 is coupled to an external computer system 20 from which the system 10 downloads a program binary code. The microprocessor 100 is for controlling the ASIC 150. The ASIC 150 is specific-purpose multifunctional component which processes the instructions and data sent by the microprocessor 100, controls another components, and accesses the memory 152. For the storage of the downloaded program code, the microprocessor 100 is coupled to the program memory 112, such as a flash memory or static RAM (SRAM); for the system using SRAM, the program download operation must be performed every time when the system is initialized, this is what makes the difference with the flash memory. In addition, the system 10 adopts a SRAM as the data memory 114. For the downloading of the program code, the system 10 must execute a boot code for initializing the system. The boot code can be programmed into the internal ROM of the microprocessor 100 such as the boot ROM 110 shown in FIG. 1, or stored in the external ROM.

The component 100 in FIG. 1 is a microprocessor such as a standard 8051 or 8051-based microprocessor. When being coupling to an external program memory or an external data memory, the microprocessor utilizes its two I/O ports, such as PORT 0 and PORT 2 of a standard 8951 microprocessor, to form an address/data bus for communicating with the external memory. For instance in the standard 8051 microprocessor, for accessing data corresponding to a memory address, the high byte of the memory address is outputted through PORT 2 while the low byte of the memory address is outputted through PORT 0. Then, PORT 0 is used for receiving or sending the data corresponding to the memory address. In this way, a latch, such as the latch 105 in FIG. 1, must be used to cooperate to complete data access processes. In a situation that the microprocessor needs to read data from the external memory, the latch 105 stores the low byte of an address outputted through PORT 0. The output of the latch 105 and the output of PORT 2 then provide a complete 16-bit address to the address input of the external memory while PORT 0 is for reading the data from the external memory.

According to the 8951-based microprocessor's specification, the read/write operations must involve several control signals including the address latch-enable (ALE) signal, program store enable (PSEN) signal, read strobe (RD) signal, and write strobe (WR) signal. Except the ALE signal, all of these signals are active low, i.e. the signal represents "enabling" when it is at a low level.

Figure 2A:
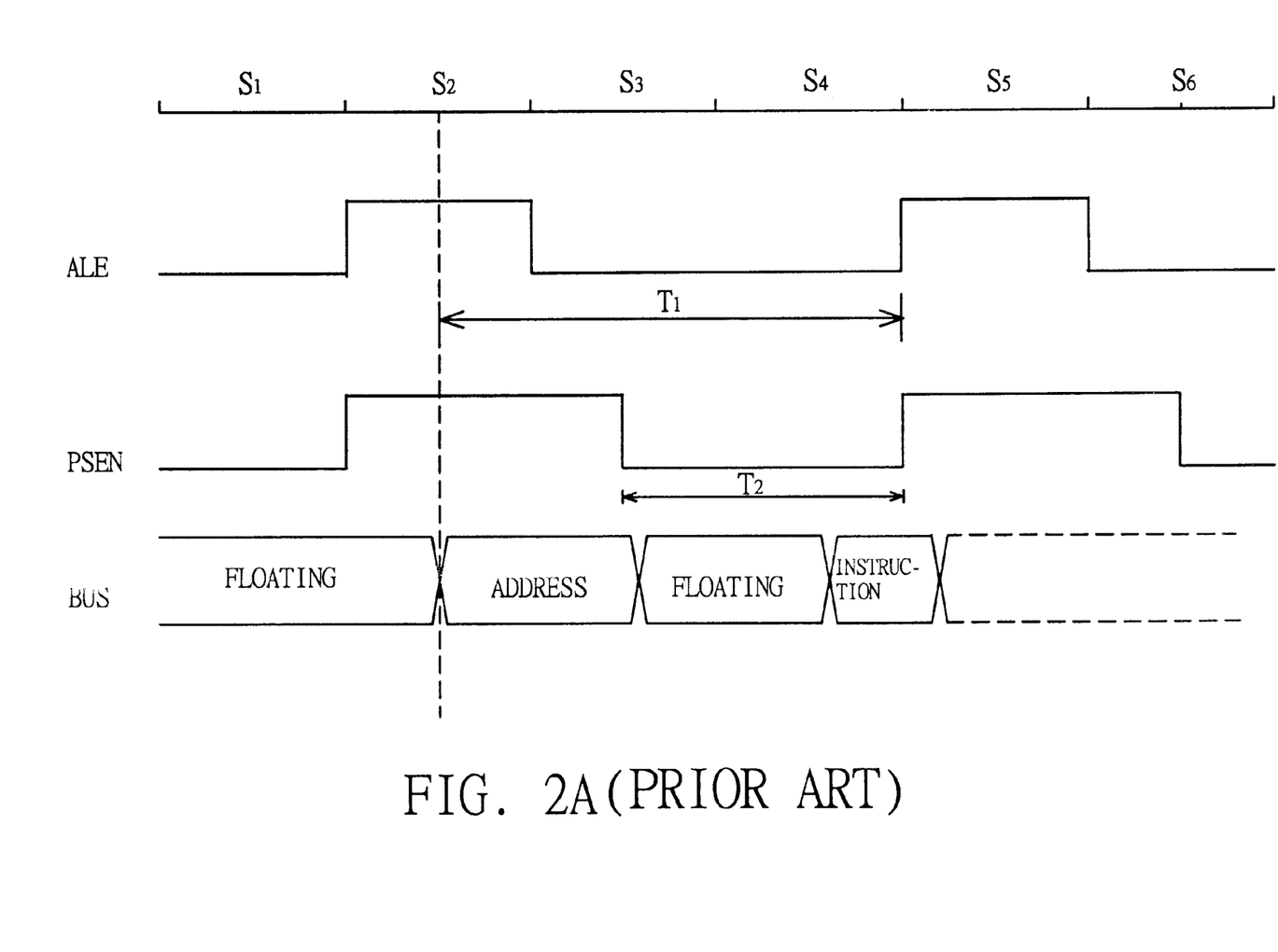
FIG. 2A illustrates the timing diagrams of the signals when the 8051 microprocessor fetches an instruction from the external program memory.

In the following, the relationship of the control signals and the clock when the 8051 microprocessor reads instructions or reads data will be described according to the timing diagrams. Referring to FIG. 2A, it illustrates the timing diagrams of the signals when the 8051 microprocessor fetches an instruction from the external program memory. In FIG. 2A, the negative edge of the ALE signal indicates that the signal provided on the bus represents a valid address signal. The negative edge triggers the latch to store the low byte of the address signal while PORT 2 outputs the high byte of the address signal. When the PSEN signal is at the low level (logic 0), it enables the external program memory 112. The bus (i.e. PORT 0) is then for receiving data. When the PSEN signal goes from the low level to the high level, the 8051 microprocessor reads the data from the program memory and regards the data as the instruction for execution.

FIG. 2A illustrates that during one machine period there are six states (S1 to S6) in which each state contains two clock cycles; thus, there are twelve clock cycles in one machine period. As can be seen in FIG. 2A, two pulses occur on the ALE signal in one machine period, corresponding to two times of fetching of instruction. If the clock cycle of the system clock is T (in sec), the width of program fetch pulse (i.e. the time of the PSEN signal in the low level) is $T_2$, where $T_2=3T$. Supposed that the system clock frequency is 12 MHz (the maximum clock frequency for a standard 8051 microprocessor), $T=83\times10^{-9}$ sec=83 ns and $T_2=3T=249$ ns. It implies that the external program memory, in response to an instruction fetch request, have to output the corresponding instruction within 249 ns when the microprocessor operates at 12 MHz.

Figure 2B:
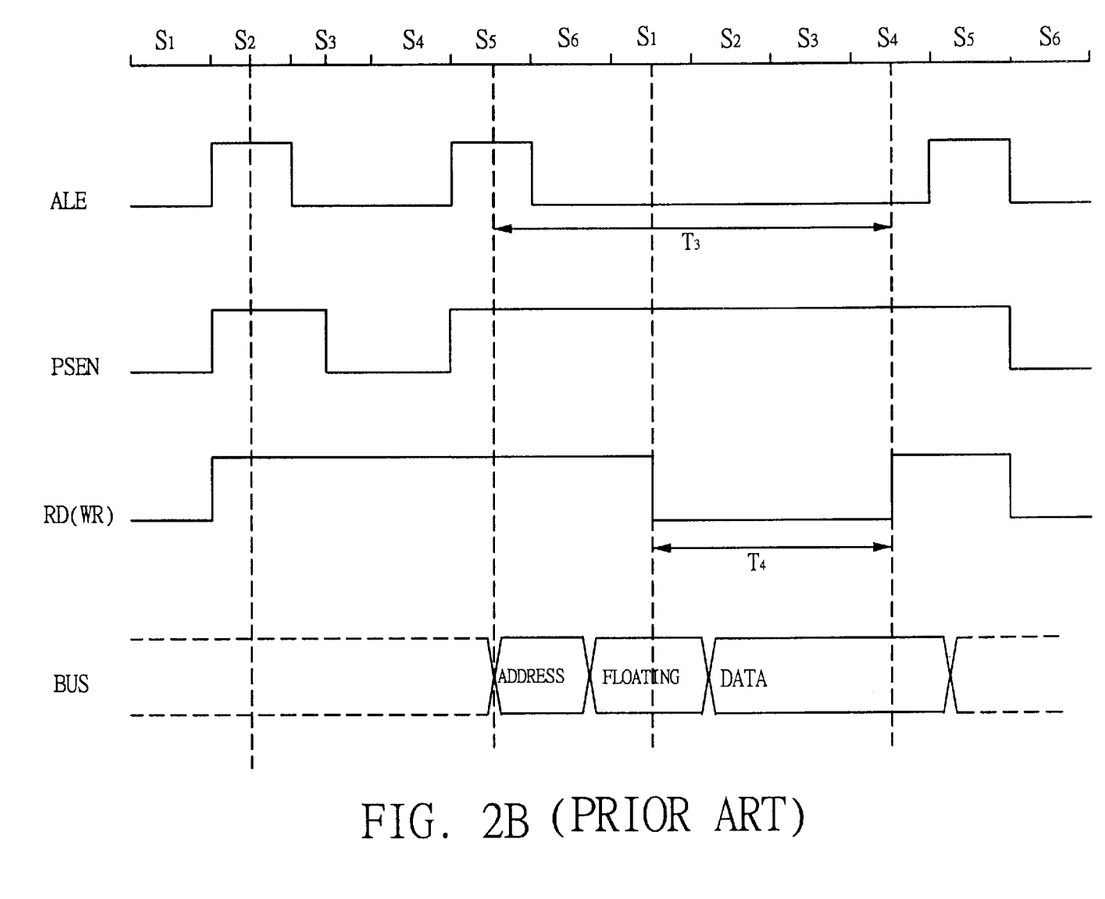
FIG. 2B illustrates the timing diagram of signals when the 8051 microprocessor reading data from or writing data into the external data memory.

Referring to FIG. 2B, it illustrates the timing diagram of signals when the 8051 microprocessor reading data from or writing data into the external data memory. For the 8051 microprocessor, the RD and WR signals are used to enable the external data memory. When the RD signal is enabled, the data memory receives the address signal and outputs the corresponding data. The microprocessor then receives the data through the bus at the positive edge of the RD signal. When the WR signal is enabled, the data of the microprocessor are outputted through the bus. The data are then written into the data memory at the positive edge of the WR signal.

When the microprocessor is to read data, the low byte of the address signal corresponding to the data is outputted through PORT 0 while the high byte of that through PORT 2. At this time, when the ALE signal goes from the high level to the low level, the negative edge triggers a latch to store the low byte of the address signal. The complete 16-bit address is then provided by the outputs of the latch and PORT 2. After that, the RD signal goes to the low level for enabling the external data memory. Referring to FIG. 2B, the time of being in the enable state of the RD signal is $T_4$, where $T_4=6T$. It implies that the external data memory, in response to the data read request, have to output the corresponding data within 6T.

For the details of the access of the external memory, please refer to the programming reference book and specification of the microprocessor.

As described above, in order to download the program code from the external system, external memories are necessary to be utilized as the program memory and the data memory. Besides, the timing of the control signals must meet the requirements of the specification. In this way, the production cost increases due to the use of the memory chips, such as using SRAM or flash memory, thus resulting in an increase of the total cost.

SUMMARY OF THE INVENTION

It is therefore an object of the invention to provide a data processing system, and a method for accessing memory by utilizing a unified memory space therein, where the data processing system downloads program code from an external computer system. By applying the principle of the invention, data processing systems can be implemented in a simplified structure so that the problem of an increase in cost due to the use of external memory chips is resolved. In addition, the functionality of the conventional program-downloadable data processing systems can be supported and fulfilled in the data processing system according to the invention with less components and simplified circuit layout, thus resulting in a simplified system design and reduction in total cost.

According to the object of the invention, it is achieved by providing a data processing system, including a microprocessor, an application specific integrated circuit (ASIC), and a memory. The microprocessor generates an address latch enable (ALEN) signal, a program memory enable (PMEN) signal, a read enable (RDEN) signal, a write enable (WREN) signal, and a first address signal. The ASIC is coupled between the microprocessor and the memory, wherein the ASIC operates at an operating frequency which is greater than an operating frequency that the microprocessor operates at. In the data processing system, the ASIC is utilized to communicate with an external computer system for downloading a program code from the external computer system to the memory in which the program code is stored in a memory region of the memory through the ASIC. The ASIC is for mapping the memory region onto an external memory address space of the microprocessor. The ASIC, during the enabling period of the ALEN signal, receives the first address signal outputted by the microprocessor, converts the first address signal into a second address signal corresponding to an address in the memory region, and reads a first data from the memory according to the second address signal. In response to the enable state of either the PMEN, RDEN, or WDEN signal, the ASIC processes the signals of the microprocessor as follows: (a) when the PMEN signal is enabled, the ASIC converts the first data into a second data and sends the second data to the microprocessor; (b) when the RDEN signal is enabled, the ASIC converts the first data into a second data and sends the second data to the microprocessor; and (c) when the WREN signal is enabled, the microprocessor sends a third data to the ASIC and the ASIC converts the third data into a fourth data and writes the fourth data into the memory according to the second address signal.

According to the object of the invention, it is achieved by providing a method for accessing memory in the data processing system. The data processing system includes a microprocessor, an ASIC, and a memory, and downloads a program code from an external computer system to the memory in which the program code is stored in a memory region in the memory. First, the microprocessor generates an address latch enable (ALEN) signal, a program memory enable (PMEN) signal, a read enable (RDEN) signal, a write enable (WDEN) signal, and a first address signal. The ASIC, during the enabling period of the ALEN signal, receives the first address signal, converts the first address signal into a second address signal corresponding to an address in the memory region, and reads a first data from the memory according to the second address signal. After the first data is read, in response to the enable state of either the PMEN, RDEN, or WDEN signal, the ASIC processes the associated signals of the microprocessor as follows. When the PMEN signal is enabled, the ASIC converts the first data into a second data and sends the second data to the microprocessor. When the RDEN signal is enabled, the ASIC converts the first data into a second data and sends the second data to the microprocessor. When the WREN signal is enabled, the microprocessor sends a third data to the ASIC, and then the ASIC converts the third data into a fourth data and writes the fourth data into the memory according to the second address signal.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENTS

System Description

Figure 3:
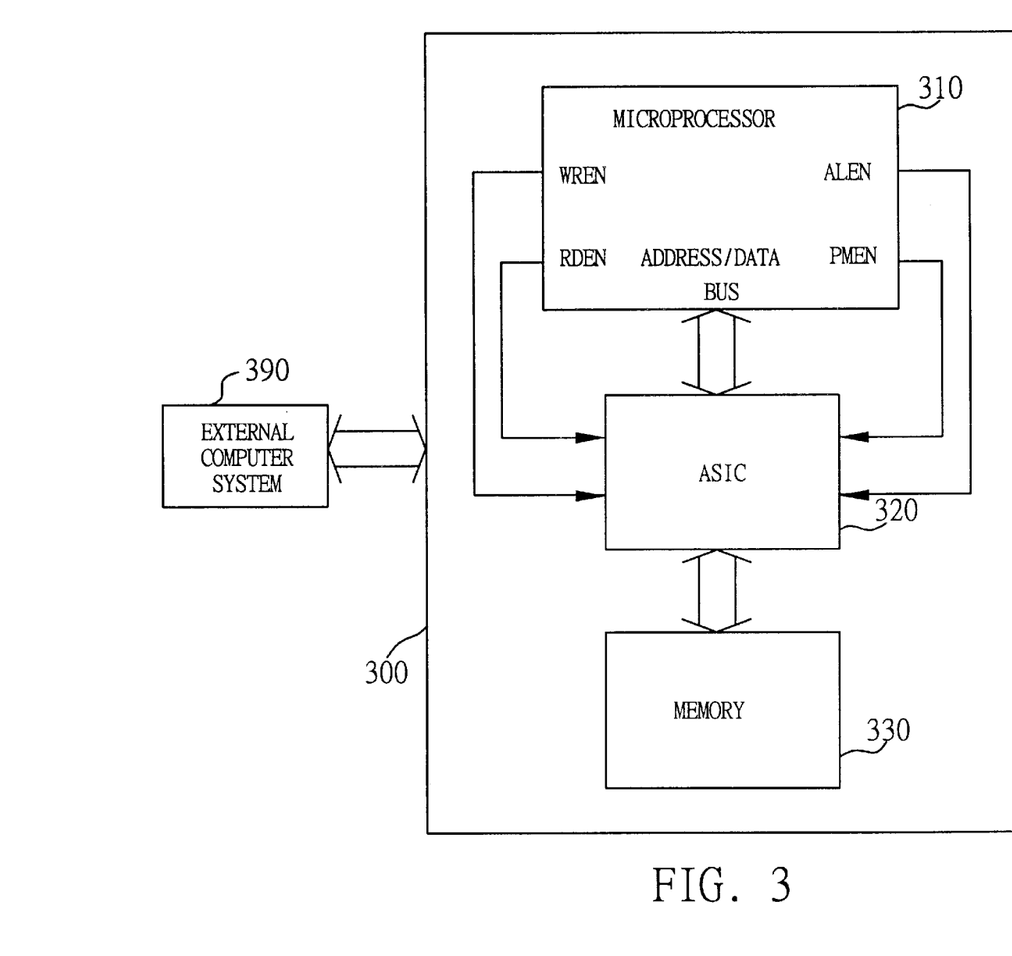
FIG. 3 illustrates a data processing system capable of downloading program code from an external computer system according to a preferred embodiment of the invention.

Referring now to FIG. 3, it illustrates a data processing system 300 capable of downloading program code from an external computer system according to the preferred embodiment of the invention. The data processing system 300 includes a microprocessor 310, an ASIC 320, and a memory 330. For performing specific data processing applications, the system 300 executes a program downloaded from an external computer system 390. For instance, the data processing system is adopted as the basic structure of a scanning system for the controlling of the scanning system.

With regard to the signals, the microprocessor 310 generates an address latch enable (ALEN) signal, a program memory enable (PMEN) signal, a read enable (RDEN) signal, a write enable (WREN) signal, and a first address signal, where the enable signals are used to enable the external memories for accessing instructions and data. The microprocessor 310 executes the downloaded program code for controlling the ASIC 320, by which the microprocessor 310 accesses the memory 330. The examples of the microprocessor 310 are 8051-based microprocessors because most of them include the specifications of control signals identical to the microprocessor 310 does. For instance in an 8051 microprocessor, it includes ALE, PSEN, RD, and WR signals that are functionally identical to the ALEN, PMEN, RDEN, and WREN signals respectively. In addition, the first address signal is outputted through the ADDRESS/DATA BUS.

The ASIC 320 is an integrated circuit designed for specific applications, which is coupled between the memory 330 and the microprocessor 310. For accessing the memory 330, the ASIC 320, in response to the control signals outputted by the microprocessor 310, maps the external addressing space to a memory region of the memory 330. The ASIC 320 operates at an operating frequency that is greater than an operating frequency that the microprocessor 310 operates at.

When the ASIC 320 responds to a data write request, it converts the data output from the microprocessor 310 and then stores the data into the memory region of the memory 330 according to a predetermined mapping method. On the other hand, the ASIC 320, in response to a data read request, reads the data from the memory 330 and converts the data into the required data according to the predetermined mapping method, and then send the required data to the microprocessor 310. To be specific, the access operations are as follow. When the ALEN signal is at enabled cycles, the ASIC 320 converts a first address signal outputted by the microprocessor 310 into a second address signal corresponding to an address in the memory region of the memory 330. The ASIC 320 then reads a first data from the memory 330. After that, either the PMEN, RDEN, or WREN signal is to be in the enable state. According to this enabling control signal, the ASIC 320 completes the operation of accessing the memory 330. If the PMEN or RDEN signal is enabled, the ASIC 320 converts the first data into the second data required by the microprocessor 310 and then sends the second data to the microprocessor 310. If the WREN signal is enabled, the microprocessor 310 outputs a third data to the ASIC 320. The ASIC 320 then converts the third data into a fourth data followed by writing the fourth data into the memory 330 according to the second address signal.

On the other hand, the ASIC 320 is used to communicate the system 300 with the external electronic apparatus, such as personal computers, hand-held computers, personal digital assistants (PDAs), or embedded systems, through a communication interface for exchanging data, such as small computer system interface (SCSI), universal serial bus (USB), serial or parallel port interfaces. Besides, the communication interface can be designed to be in the ASIC. In addition to communication, the ASIC 320 provides another specific applications. For instance in a scanning apparatus, an ASIC is used for clock signals generation, digital-to-analog conversion, and digital image processing.

As for the memory 330, it is used for the storage of the program code and data of the microprocessor 310. For the data processing system in practice, volatile memory is suitable to be adopted, such as extended data-out (EDO) dynamic RAM (DRAM) or synchronous DRAM.

In order to initialize the data processing system 300, the microprocessor 310 executes a boot code, for performing various initialization operations, such as initiating various components of the system 300 or downloading the program for execution after initialization. For the storage of the boot code, one way is to store it in the internal ROM of the microprocessor 310 and the other way is to store it in an external ROM with a latch as shown in FIG. 1.

To sum up, the object of the invention is fulfilled that the external program memory and external data memory are no longer used in the program-downloadable data processing system by utilizing a memory region in the memory used for the ASIC in the system. Through the mapping method of the invention, the external memory address space of the microprocessor is mapped onto the memory region in the memory that is originally used for the ASIC. In addition, for accessing data or fetching instructions, the control signals that the microprocessor output are processed by the ASIC in order to meet the requirements of signal timing of the microprocessor. Therefore, a program-downloadable data processing system can be implemented in a more compact design in structure than the conventional one without degradation of the total system performance, thus resulting in a significant reduction in total cost.

System Operation

In the data processing system as shown in FIG. 3, the approach of processing the control signals generated by the microprocessor is different from the conventional one. It is because the ASIC, in response to an instruction fetch request or a data read request from the microprocessor, must complete the corresponding operations within an effective period. Otherwise, the microprocessor will not function.

In the following, the operations of fetching instruction, reading data, and writing data are discussed, where it is supposed that the application program code that the microprocessor executes is already downloaded from the external computer system and stored in a memory region of the memory.

After the microprocessor executes an instruction of the program code, the microprocessor yields an instruction fetch request indicated by the transition of the PMEN signal to the enable state. When the microprocessor requires reading or writing data, the microprocessor correspondingly generates a data read request or a data write request, indicated by the transition of the RDEN or WREN signal to the enable state. Besides, at a certain time, either the PMEN, RDEN, or WREN signal is in the enable state. According to the requirements of the microprocessor, the enable state can be corresponded to active low or active high.

Figure 4A:
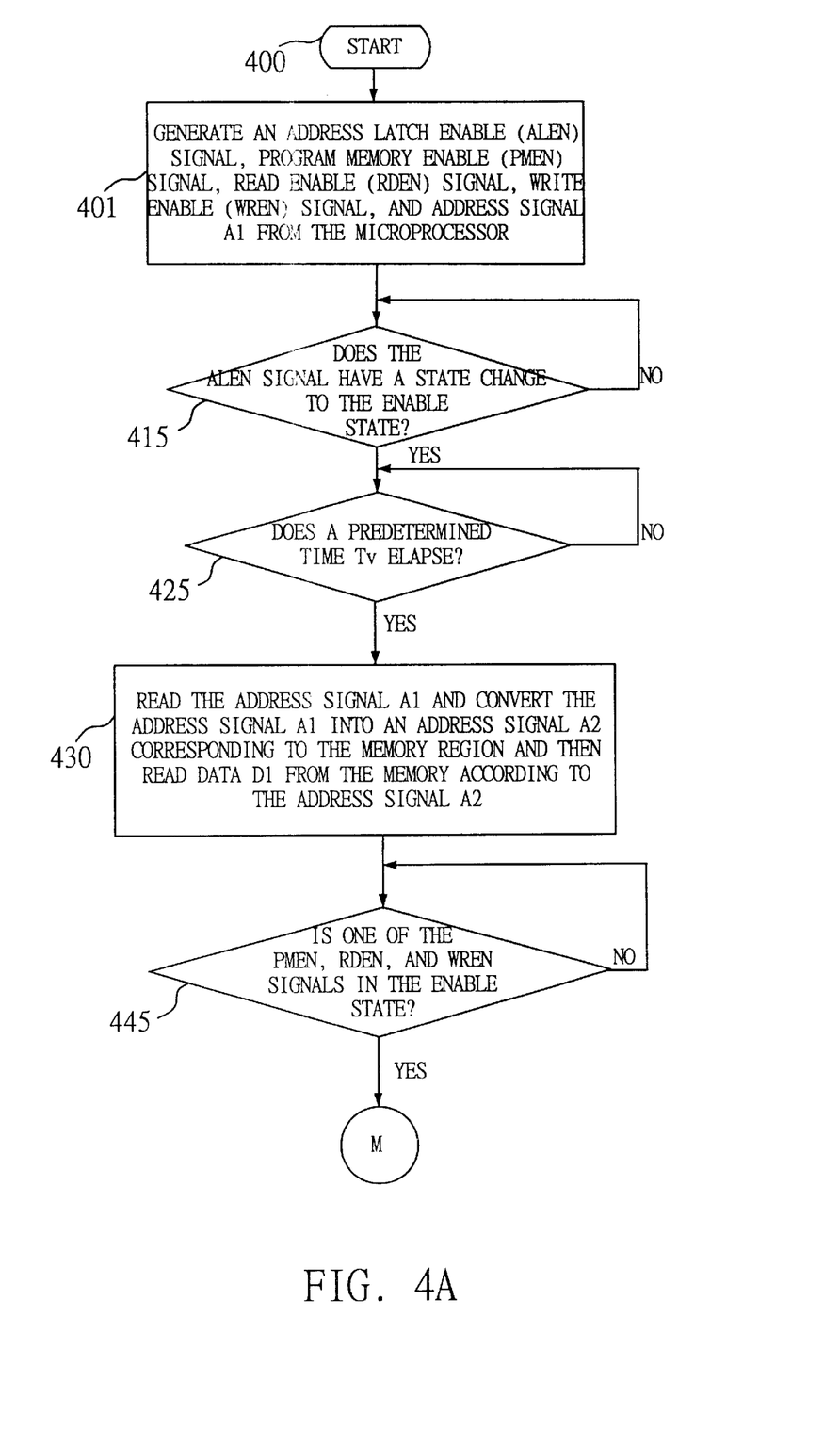
FIGS. 4A and 4B illustrate the flowchart of a method for accessing data in the data processing system according to the preferred embodiment of the invention.
Figure 4B:
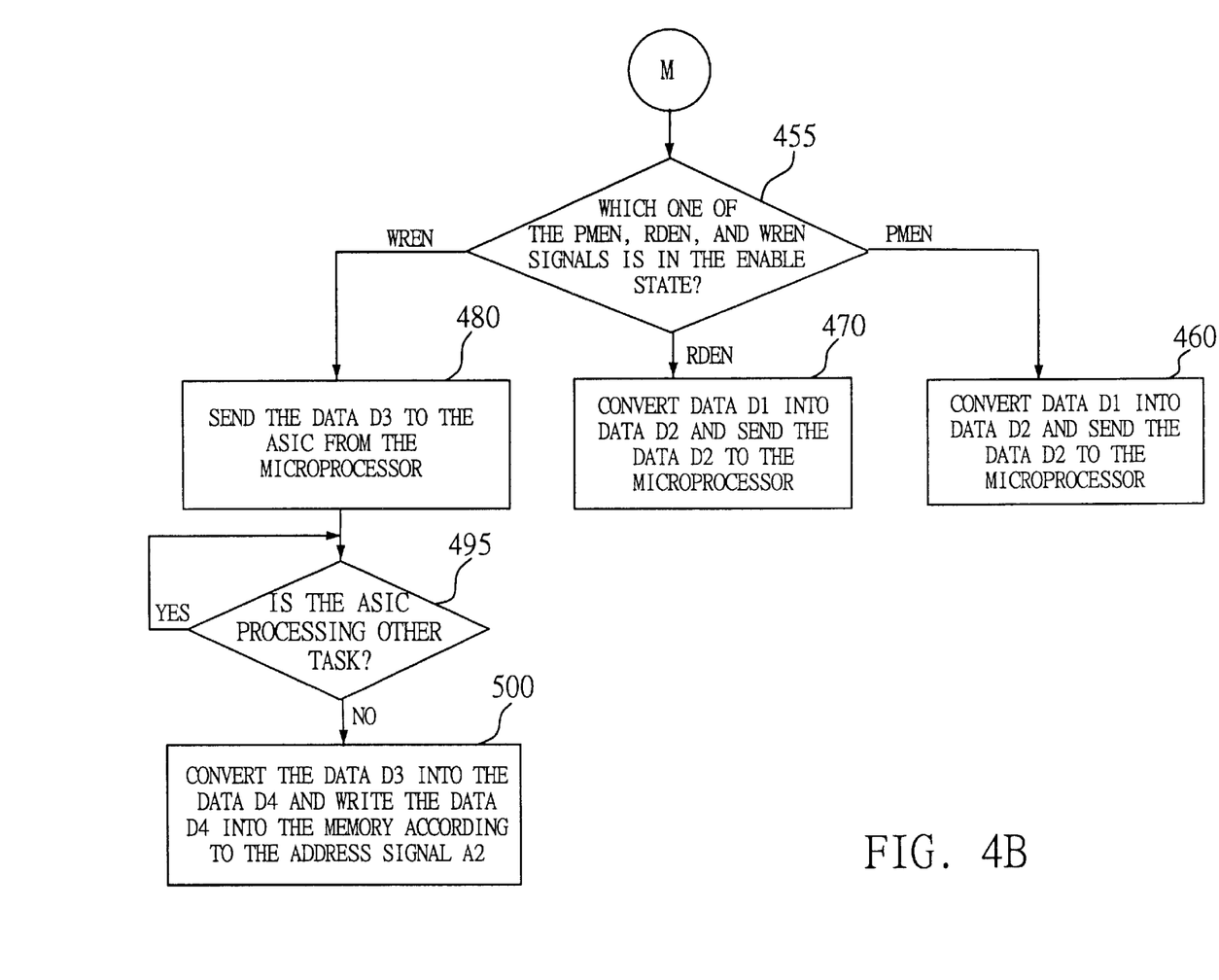

Referring to FIGS. 4A and 4B, a method for accessing data in the data processing system according to the preferred embodiment of the invention is illustrated in the flowchart. The data processing system includes the microprocessor, ASIC, and memory. The data processing system downloads an application program code from the external computer system to a memory region in the memory via the ASIC for the microprocessor to execute.

The method begins at step 400 of FIG. 4A and proceeds to step 401. In step 401, the microprocessor generates an address latch enable (ALEN) signal, a program memory enable (PMEN) signal, a read enable (RDEN) signal, a write enable (WREN) signal, and an address signal A1. Next, as shown in steps 415, 425, and 430, during the period of the ALEN signal being in the enable state, the ASIC reads the address signal A1 and converts the address signal A1 into an address signal A2 corresponding to the memory region and then reads data D1 from the memory according to the address signal A2. In step 415, the ALEN signal is being detected as to whether it has a state change to the enable state. In step 415, if it is determined that the ALEN signal is changed to the enable state, the method proceeds to step 425. If not, the detection continues. In step 425, the ASIC starts to wait until a predetermined time $T_v$ has elapsed. When the predetermined time $T_v$ has elapsed, the address signal A1 is valid and the method proceeds to step 430. In step 430, the ASIC reads the address signal A1 and converts the address signal A1 into the address signal A2 corresponding to the memory region and then reads data D1 from the memory according to the address signal A2. After the data D1 is read, the ASIC, as shown in steps 445 and 455, responds to the access request of the microprocessor according to the enable state of either the PMEN, RDEN, or WREN signal. In step 445, a determination is made whether one of the PMEN, RDEN, and WREN signals is in the enable state. If so, it proceeds to step 455. In step 455, a determination is made for detecting which one of the PMEN, RDEN, and WREN signals is in the enable state and then the request of the enabled signal is responded according to the enabled signal. If the PMEN signal is in the enable state, the method proceeds to step 460, where the ASIC converts data D1 into data D2 and sends the data D2 to the microprocessor. If the RDEN signal is in the enable state, the method proceeds to step 470, where the ASIC converts data D1 into data D2 and sends the data D2 to the microprocessor. If the WREN signal is in the enable state, the microprocessor, as shown in steps 480–500, converts data D3 into data D4 and writes the data D4 into the memory 330 according to the address signal A2. In step 480, the microprocessor sends the data D3 to the ASIC and the ASIC stores the data D3. In step 495, the data D3 is waiting to be processed by the ASIC; if the ASIC is processing other tasks or data, such as processing the page read request of the other component, the method proceeds to step 500 until the page read process is completed. Finally, as shown in step 500, the ASIC converts the data D3 into the data D4 and the data D4 is written into the memory 330 according to the address signal A2.

In the method of accessing data in the data processing system above, the predetermined time $T_v$ is defined according to timing characteristics of the microprocessor, and the operating frequencies of the microprocessor and the ASIC. For instance in a data processing system, such as a scanner, including an 8051-based microprocessor operating at 12 MHz, and an ASIC operating at 24 MHz, the predetermined time $T_v$ is preferably defined as one clock cycle of the microprocessor, i.e. $T_v=1/(12\times10^{-6})$ sec, according to the timing characteristics shown in FIGS. 2A and 2B.

On the other hand, in the method of accessing data in the data processing system described above, the data D1 is read from the memory region regardless of the PMEN, RDEN, or WREN signals. In this way, in the method of accessing data and the data processing system according to the preferred embodiment of the invention, the ASIC maps an external memory address space of the microprocessor onto the memory region of the memory so that the microprocessor can access the memory properly without degrading the system performance. In the following, two approaches of memory space addressing are described according to the preferred embodiment of the invention.

Mapping Method of Address Space:

EXAMPLE I

In the example, the address space of the program memory and the address space of the data memory are combined into one memory region. In other words, the combined memory region contains two different portions where one is for the storage of program code and the other is for the storage of data.

Figure 5:
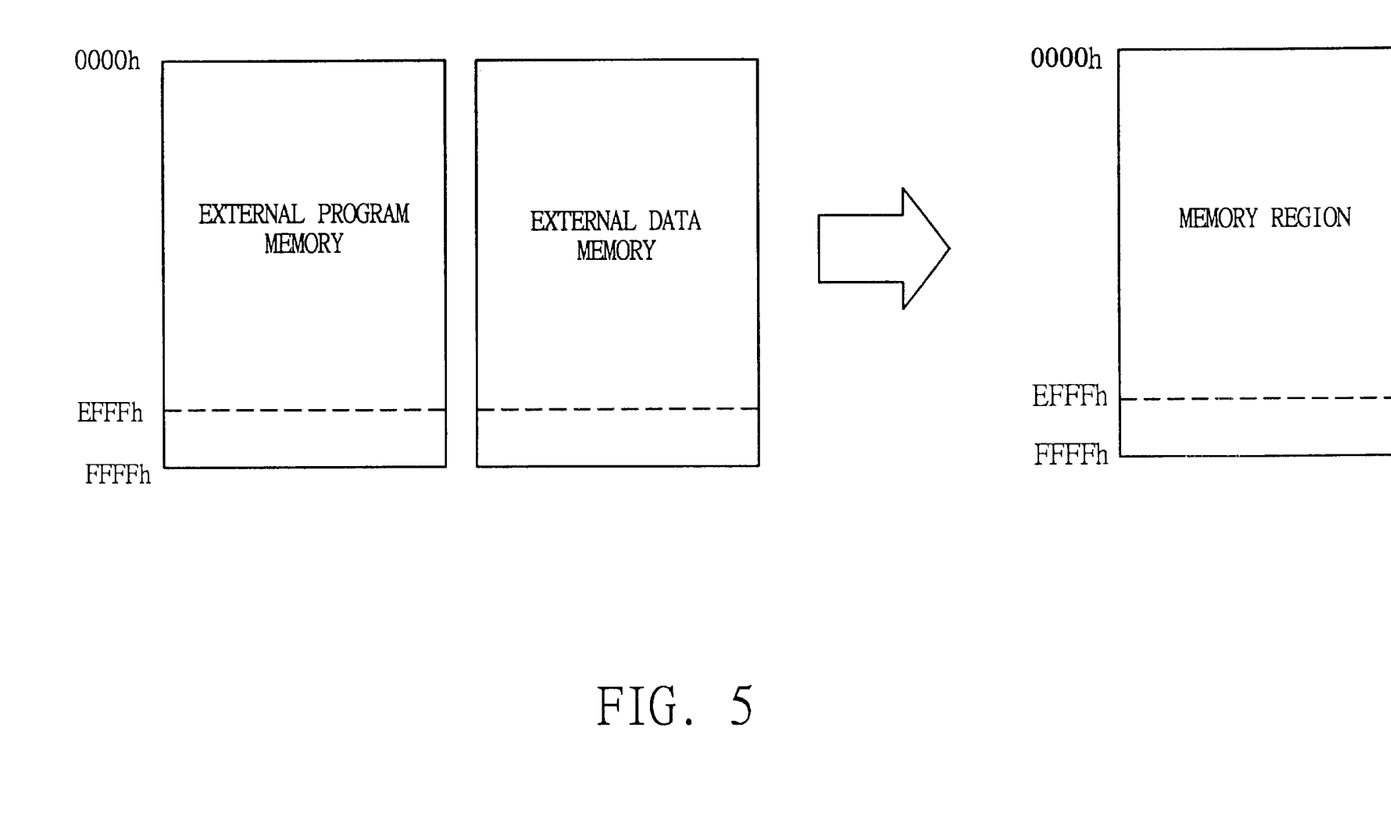
FIG. 5 illustrates the first example of addressing method for accessing a memory region in the data processing system according to the preferred embodiment of the invention.

Referring to FIG. 5, it illustrates the first example of addressing method for accessing a memory region in the data processing system according to the preferred embodiment of the invention. In FIG. 5, a physical memory area of 64Kbytes in size in the memory of the data processing system is defined as the memory region and corresponds to the external memory address space defined by the 8051 microprocessor, which is of 64K addresses. Besides, the distribution of the memory region of the system for the program memory and the data memory is decided by the programmer of the microprocessor. The programmer should be noted that the memory region is to be distributed into two portions where one is for the storage of program code and the other is for the storage of data. In addition, in the memory region, any address value corresponding to the memory space for storing program codes or data is unique and the address value defining the division of the two portions should be specific.

As can be seen in FIG. 5, for instance in the predefined memory region which contains 64K memory addresses, the addresses from 0000h (h for hexadecimal) to EFFFh (i.e. 60K) is assigned for program memory while the addresses from F000h to FFFFh (i.e. 4K) is assigned for data memory. Besides, the physical memory address of an address in the memory region is the physical base address of the memory plus the memory address in the memory region. On the other hand, when accessing the data for the microprocessor, the ASIC converts the data according to the data width of the memory. For instance in a data processing system having a 8-bit microprocessor and a 16-bit memory, for writing data of the microprocessor into the memory, the ASIC converts the 8-bit data into 16-bit data and then written the converted data into the memory. In addition, for reading data for the microprocessor, the ASIC converts the 16-bit data read into 8-bit data and then sends the converted data to the microprocessor.

Since the memory region is distributed and managed by the ASIC, after the boot code initializes the ASIC, the way of accessing the memory is unchanged from the microprocessor's viewpoint.

Mapping Method of Address Space:

EXAMPLE II

Figure 6:
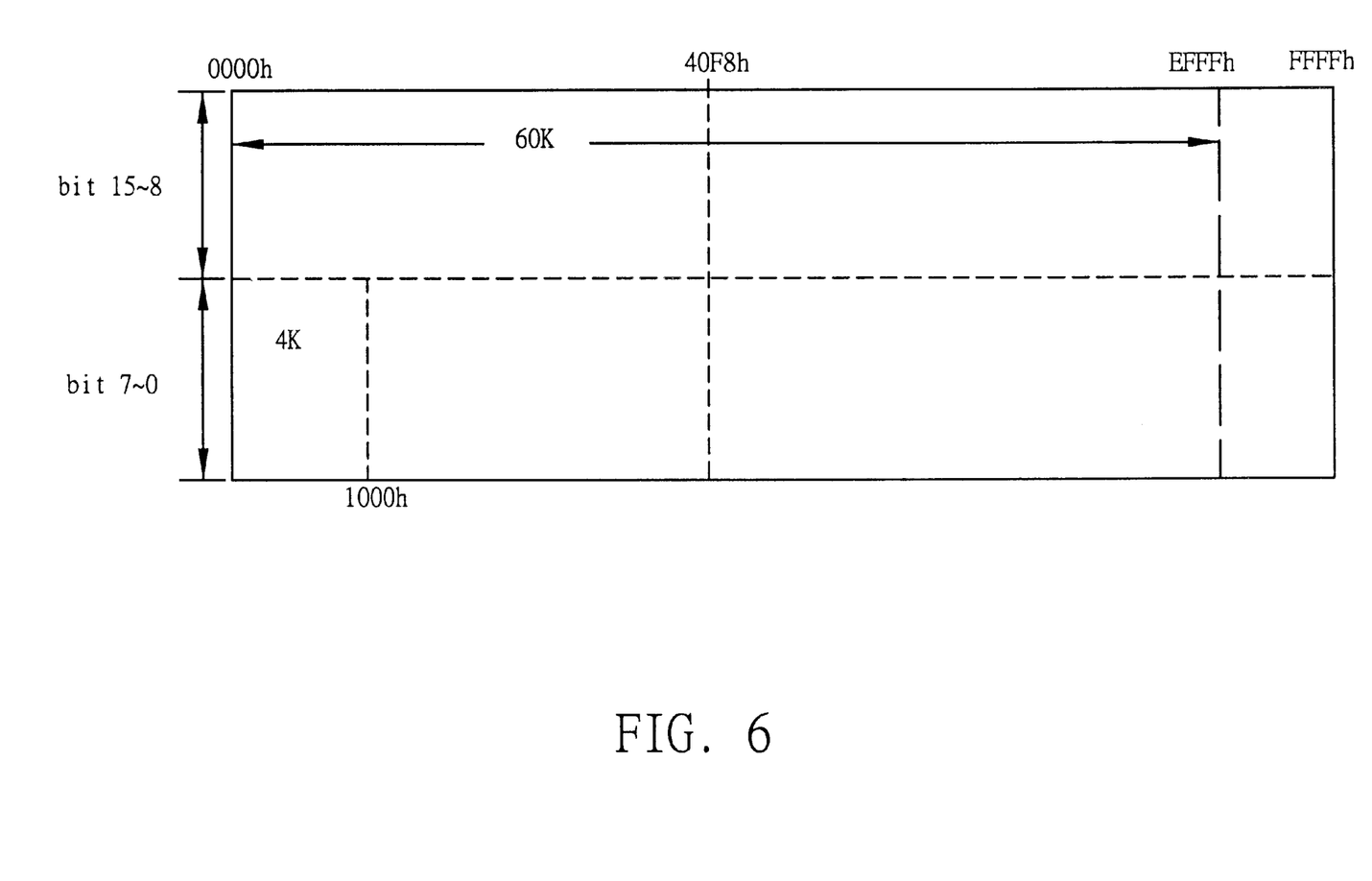
FIG. 6 illustrates the second example of addressing method for accessing a memory region in the data processing system according to the preferred embodiment of the invention.

Referring to FIG. 6, it illustrates the second example of addressing method for accessing a memory region in the data processing system according to the preferred embodiment of the invention. The mapping method involves using a physical memory area in the memory as the program memory and the data memory where each address corresponds to the memory space for storing both a program code and data. When the content corresponding to an address in the memory region is read, the ASIC selects the required program code or data according to the enabled control signals. The mapping method is applicable to the situation that the data width of the memory is the two times of the microprocessor's or above. For instance, as shown in FIG. 3, the ASIC utilizes 16-bit memory such as 256×16 bit EDO DRAM. In the 16-bit DRAM, each address corresponds to memory for the storage of two bytes of data (i.e. one word of data). Thus, for an 8-bit microprocessor, such as an 8051-based microprocessor, a physical memory area can be assigned as the memory region where each address in the memory region corresponds to the memory that its high byte is for the storage of program code and its low byte is for the storage of data.

As shown in FIG. 6, the memory of the data processing system provides a physical memory area of 64K having memory of 128Kbytes in size, for the microprocessor as the memory region. In the memory region, addresses from 0000h to FFFFh are for addressing both the program memory and data memory. In other words, there is 64K program memory address space as well as the data memory address space. Besides, for an address in the memory region, bits 8 to 15 (i.e. the high byte) are for the storage of program code while bits 0 to 7 (i.e. the low byte) are for the storage of data. In FIG. 6, the microprocessor utilizes 60K addresses and the high bytes in the corresponding memory region are for the storage of the program code while 4K addresses is utilized and the low bytes in the corresponding memory region are for the storage of data. During processing a read request, the ASIC utilizes the 8051 microprocessor's PSEN signal to select the high byte data read from the memory so the ASIC does send the instruction that the 8051 microprocessor requires to the microprocessor, not the data having the same address value. For instance that the microprocessor needs to fetch the next instruction stored at address 40F8h in the memory region with the base address 3FFFh. The ASIC maps the address 40F8h to 3FFFh+40F8h and reads the content corresponding to the address 3FFFh+40F8h, where the content is of 16-bit. When the PSEN signal is in the enable state, the ASIC selects the bits 8 to 15 from the 16-bit data and then sends the selected data to the 8051 microprocessor. On the other hand, when data is to be written into the memory region, the ASIC, according to the mapping method, converts the data output from the microprocessor into the data that the low byte corresponds to the microprocessor's data output and then writes the converted data into the memory.

The advantage of the mapping method is that the program memory and the data memory both are capable of having the address space of the same size. For instance in the data processing system with an 8051-based microprocessor, both the program memory and the data memory can have an address space of 64K respectively.

Since the memory region is distributed and managed by the ASIC, after the boot code initializes the ASIC, the way of accessing the memory is unchanged from the microprocessor's viewpoint.

Through the data processing system and mapping method according to the preferred embodiment of the invention, the ASIC provides the data read or instruction fetch request to the memory when the address outputted by the microprocessor is valid. In other words, the request is provided to the memory in advance as compared with the conventional way. Referring to FIG. 2A, the elapsed time beginning at the time of address valid and ending at the end of the fetch pulse is $T_1$, where $T_1=5T$. If the system clock frequency is 12 MHz, $T_1=415$ ns. In FIG. 2B, the elapsed time beginning at the time of address valid and ending at the end of the read pulse is $T_3$, where $T_3=10T$. From the aspect of the ASIC in the preferred embodiment, the instruction fetch period extends from 3T to 5T, resulting in an increase of 67%, while the data read period extends from 6T to 10T, resulting in an increase of 67% as well. In the implementation of the scanner according to the preferred embodiment of the invention, it applies a data processing system including an 8051-based microprocessor operating at 12 MHz, an ASIC operating at 24 MHz, and a 60 ns EDO DRAM, where the ASIC is coupled between the microprocessor and the DRAM. Through the application of the invention, the limitation of data reading is extended, resulting in the capability of supporting burst 4 mode operation in the system, i.e. a series of data read request of maximum 4 is supported. As compared with the instance of scanning system, without the application of the invention, the burst mode cannot be supported in the scanning system because the fetch or read cycle is short that the ASIC will be unable to respond to a fetch or read request within the corresponding cycle.

After the disclosure of the two mapping methods above, it should be noted that it does not mean to restrict the mapping method used by the invention to the two examples. The system designers can adopt any other approach of mapping method suitable to the required system in their implementations, according to the principle of the invention.

Program Code Downloading

After the description of the approach of accessing data of the microprocessor in the data processing system, the way of downloading program code is to be described. The ASIC, as shown in FIG. 3 is regarded as the component that communicates the system with the external computer system. The ASIC has a communication interface, such as the universal serial bus (USB) interface, used for communicating with the external computer system, such as a personal computer or a portable computer. Besides, the external computer system executes a device driver for communicating with the data processing system and for the downloading of the program code to the data processing system.

The operation of the downloading of program code is as follows. First, the device driver initiates the transfer by using handshaking through the communication interface for the confirmation as to whether the microprocessor of the data processing system is ready for downloading. Next, the microprocessor initiates the ASIC to assign a memory region to the microprocessor for the storage of the program code and data. The ASIC then responds to the device driver of the data processing system and receives the program code sent by the ASIC through the communication interface and writes them into the memory region. When the program code is downloaded completely, the ASIC informs the microprocessor and then it ends up the downloading of program code. At that time, the executing boot code of the microprocessor terminates and the downloaded program code stored in the memory region is then executed. The data processing system changes its operation mode from the initialization mode to the normal mode.

In the preferred embodiment described above, an 8051 microprocessor is utilized. It should be noted that the implementation of the microprocessor of the data processing system is not restricted to the 8051-based microprocessor. All microprocessors that have the control signals functionally equivalent to that of the microprocessor described above can also be utilized as the implementation of the microprocessor, such as 8042- or 8096-based microprocessors and any other similar microprocessors.

According to the preferred embodiment of the invention, the data processing system and the method of accessing the memory therein are disclosed. It resolves the problem of the increase in production cost when utilizing the external memory. According to the invention, the microprocessor can access the memory that is originally designed for the ASIC to access, resulting in a simplified system design and circuit layout. For the achievement of the functionality, the ASIC only needs to be modified to add some simple functions. In this way, it does not affect the system performance that the system should provide. Furthermore, according to the invention, it brings about more flexibility of the system design and production maintenance, thus resulting in the total system cost reduction.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data processing system, comprising:
a microprocessor generating an address latch enable (ALEN) signal, a program memory enable (PMEN) signal, a read enable (RDEN) signal, a write enable (WREN) signal, and a first address signal;
an application specific integrated circuit (ASIC) coupled to the microprocessor, wherein the ASIC operates at an operating frequency which is greater than an operating frequency that the microprocessor operates at; and
a memory coupled to the ASIC;
wherein the data processing system utilizes the ASIC to communicate with an external computer system for downloading a program code from the external computer system to the memory in which the program code is stored in a memory region of the memory through the ASIC and the ASIC is for mapping the memory region onto an external memory address space of the microprocessor; and
wherein the ASIC, during the enabling period of the ALEN signal, receives the first address signal outputted by the microprocessor, converts the first address signal into a second address signal corresponding to an address in the memory region, reads a first data from the memory according to the second address signal, and
(a) when the PMEN signal is enabled, the ASIC converts the first data into a second data and sends the second data to the microprocessor;
(b) when the RDEN signal is enabled, the ASIC converts the first data into a second data and sends the second data to the microprocessor; and
(c) when the WREN signal is enabled, the microprocessor sends a third data to the ASIC and the ASIC converts the third data into a fourth data and writes the fourth data into the memory according to the second address signal.

2. A data processing system according to claim 1, wherein the external memory address space of the microprocessor includes:
a first address area, wherein each address in the first address area is for corresponding to instructions of the program code; and
a second address area, wherein each address in the second address area is for corresponding to data of the microprocessor;
wherein each address in the first address area and each address in the second address area are different in address value.

3. A data processing system according to claim 1, wherein the microprocessor is an n-bit microprocessor and the memory is an m-bit memory device, where m is greater than or equal to 2n.

4. A data processing system according to claim 3, wherein the external memory address space of the microprocessor includes:
a first address area, wherein each address in the first address area is for corresponding to instructions of the program code; and
a second address area, wherein each address in the second address area is for corresponding to data of the microprocessor;
wherein an address in the external memory address space of the microprocessor corresponds to an address in the memory region, and the address in the memory region corresponds to a memory space for storing:
a program instruction corresponding to an address in the first address area; and
data corresponding to an address in the second address area, wherein the address in the second address area and the address in the first address area are identical in address value.

5. A data processing system according to claim 1, wherein the ASIC, during the enabling period of the ALEN signal, reads the first address signal when a predetermined time $T_v$ has elapsed since the ALEN signal is enabled, and the first address signal is valid when the predetermined time $T_v$ has elapsed.

6. A data processing system according to claim 1, wherein the microprocessor is for executing a boot code for setting the ASIC to communicate with the external computer system for downloading the program code.

7. A data processing system according to claim 6, wherein the microprocessor comprises a non-volatile memory for storing the boot code.

8. A data processing system according to claim 1, wherein the ASIC comprises a communication interface for being coupled to the external computer system.

9. A data processing system according to claim 1, wherein the microprocessor is a standard-8051-based microprocessor.

10. A data processing system according to claim 1, wherein the memory is an extended data-out (EDO) dynamic random access memory (DRAM) or a synchronous DRAM (SDRAM).

11. A method for accessing data in the data processing system, the data processing system comprising a microprocessor, an ASIC, and a memory, and downloading a program code from an external computer system to the memory, the program code being stored in a memory region in the memory, the method comprising the steps of:

(a) generating an address latch enable (ALEN) signal, a program memory enable (PMEN) signal, a read enable (RDEN) signal, a write enable (WDEN) signal, and a first address signal at the microprocessor;

(b) during the enabling period of the ALEN signal, receiving the first address signal, converting the first address signal into a second address signal corresponding to an address in the memory region, and reading a first data from the memory according to the second address signal at the ASIC;

(c) when the PMEN signal is enabled, converting the first data into a second data and sending the second data to the microprocessor;

(d) when the RDEN signal is enabled, converting the first data into a second data and sending the second data to the microprocessor; and (e) when the WREN signal is enabled, sending a third data to the ASIC from the microprocessor, and then, at the ASIC, converting the third data into a fourth data and writing the fourth data into the memory according to the second address signal.

12. A method according to claim 11, wherein the step (b) comprises:

(b1) determining whether the ALEN signal is enabled and repeating the step (b1) if the ALEN signal is not enabled;

(b2) during the enabling period of the ALEN signal, reading the first address signal when a predetermined time $T_v$ has elapsed since the ALEN signal is enabled, wherein the first address signal is valid when the predetermined time $T_v$ has elapsed; and (b3) reading the first address signal, converting the first address signal into the second address signal corresponding to an address in the memory region, and reading a first data from the memory according to the second address signal.

13. A method according to claim 11, wherein the step (e) comprises:

(e1) sending the third data to the ASIC and storing the third data in the ASIC;

(e2) waiting for the ASIC to process the third data;

repeating the step (e2) until the ASIC is able to process the third data; and (e3) converting the third data into the fourth data and writing the fourth data into the memory according to the second address signal.

14. A method according to claim 11, wherein the microprocessor has an external memory address space including:

a first address area, wherein each address in the first address area is for corresponding to instructions of the program code; and a second address area, wherein each address in the second address area is for corresponding to data of the microprocessor;

wherein each address in the first address area and each address in the second address area are different in address value.

15. A method according to claim 14, wherein the first address signal is a signal corresponding to an address in the external memory address space.

16. A method according to claim 11, wherein the microprocessor is an n-bit microprocessor and the memory is an m-bit memory device, where m is greater than or equal to 2n.

17. A method according to claim 16, wherein the microprocessor has an external memory address space including:

a first address area, wherein each address in the first address area is for corresponding to instructions of the program code; and a second address area, wherein each address in the second address area is for corresponding to data of the microprocessor;

wherein an address in the external memory address space of the microprocessor corresponds to an address in the memory region, and the address in the memory region corresponds to a memory space for storing:

a program instruction corresponding to an address in the first address area; and data corresponding to an address in the second address area, wherein the address in the second address area and the address in the first address area are identical in address value.

18. A method according to claim 17, wherein the first address signal is a signal corresponding to an address in the external memory address space.

* * * * *